United States Patent [19]

Unseld

[11] Patent Number: 5,639,414

[45] Date of Patent: Jun. 17, 1997

[54] METHOD AND APPARATUS OF MANUFACTURING PNEUMATIC VEHICLE TIRES

[75] Inventor: Klaus Unseld, Hanau, Germany

[73] Assignee: SP Reifenwerke GmbH, Hanau, Germany

[21] Appl. No.: 464,060

[22] Filed: Jun. 5, 1995

[30] Foreign Application Priority Data

Jun. 9, 1994 [DE] Germany .................. 44 20 198.2

[51] Int. Cl.$^6$ ................................................ B29C 35/08
[52] U.S. Cl. .................. 264/402; 219/682; 264/489; 264/490; 264/326; 425/41; 425/174.8 E
[58] Field of Search .................. 264/489, 490, 264/402, 403, 327, 315, DIG. 46, 326; 219/678, 679, 690, 691, 694, 695, 682; 425/174.4, 41, 174.8 E, 174.8 R, DIG. 13

[56] References Cited

U.S. PATENT DOCUMENTS

| | | |
|---|---|---|
| 2,495,170 | 1/1950 | Kinn . |
| 2,618,812 | 11/1952 | Hulswitt, Jr. et al. . |
| 3,745,291 | 7/1973 | Peterson et al. . |
| 3,867,606 | 2/1975 | Peterson . |
| 4,208,562 | 6/1980 | Perreault . |
| 4,456,806 | 6/1984 | Arimatsu . |
| 4,481,159 | 11/1984 | Itoh . |

FOREIGN PATENT DOCUMENTS

| | | |
|---|---|---|
| 0072505 | 8/1982 | European Pat. Off. . |
| 0640470 | 8/1994 | European Pat. Off. . |
| 2016679 | 5/1970 | France . |
| 59-114042 | 6/1984 | Japan . |
| 2-223409 | 9/1990 | Japan . |
| 759001 | 10/1954 | United Kingdom . |
| 1587889 | 4/1981 | United Kingdom . |
| 2157224 | 10/1985 | United Kingdom . |

*Primary Examiner*—Mathieu D. Vargot
*Attorney, Agent, or Firm*—Birch, Stewart, Kolasch & Birch, LLP

[57] ABSTRACT

A method of manufacturing pneumatic vehicle tires, the tires having a carcass which extends between two bead rings and a breaker arranged between the carcass and a tread, wherein the respective tire blank is built up using exclusively non-metallic components, and wherein, in the course of vulcanization and shaping which takes place under the action of heat and pressure, at least a part of the thermal energy that is required is introduced into the tire in the form of microwave energy. In order to improve the tire quality and in particular to avoid defects as a result of incorrect thermal treatment, the temperature which prevails in the tire is controlled in different tire regions in dependence on the temperature development and differently for different tire regions.

18 Claims, 7 Drawing Sheets

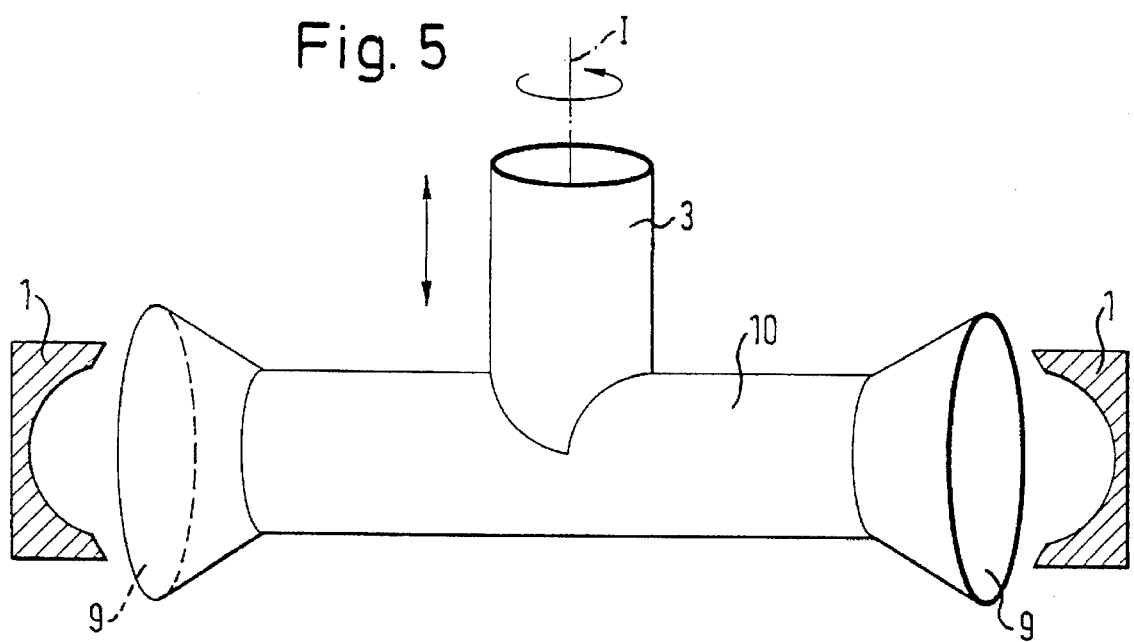
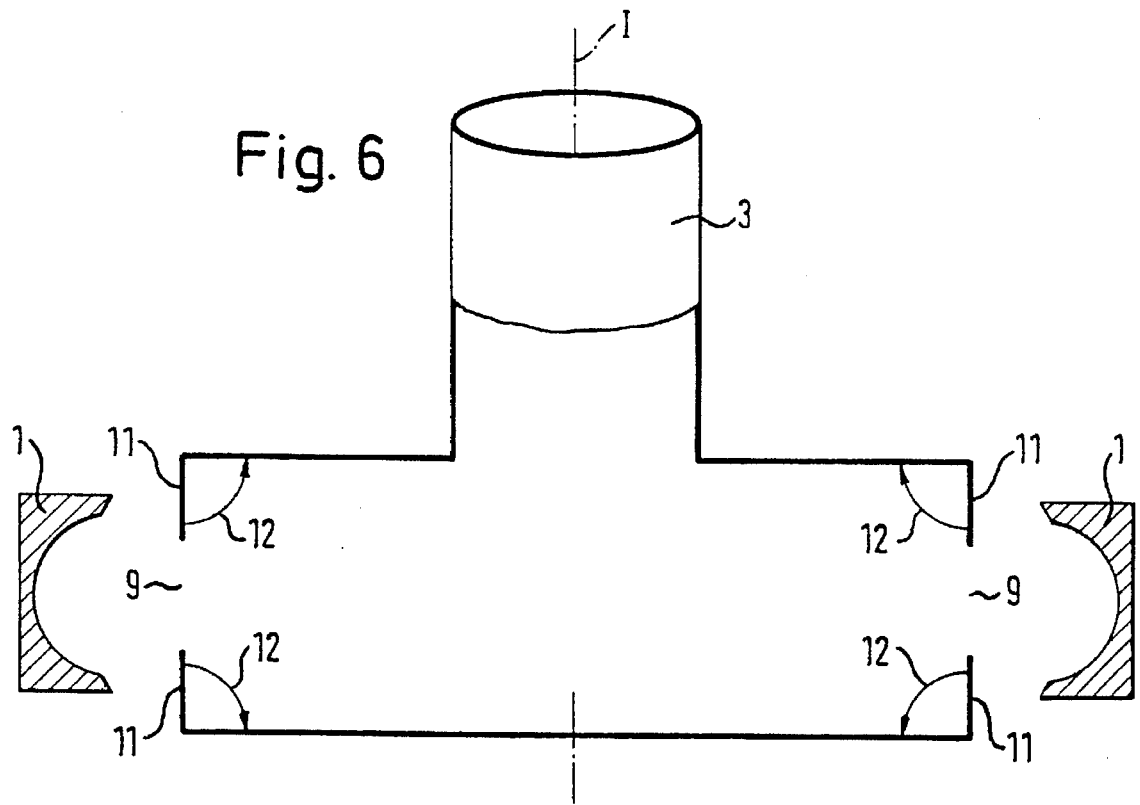

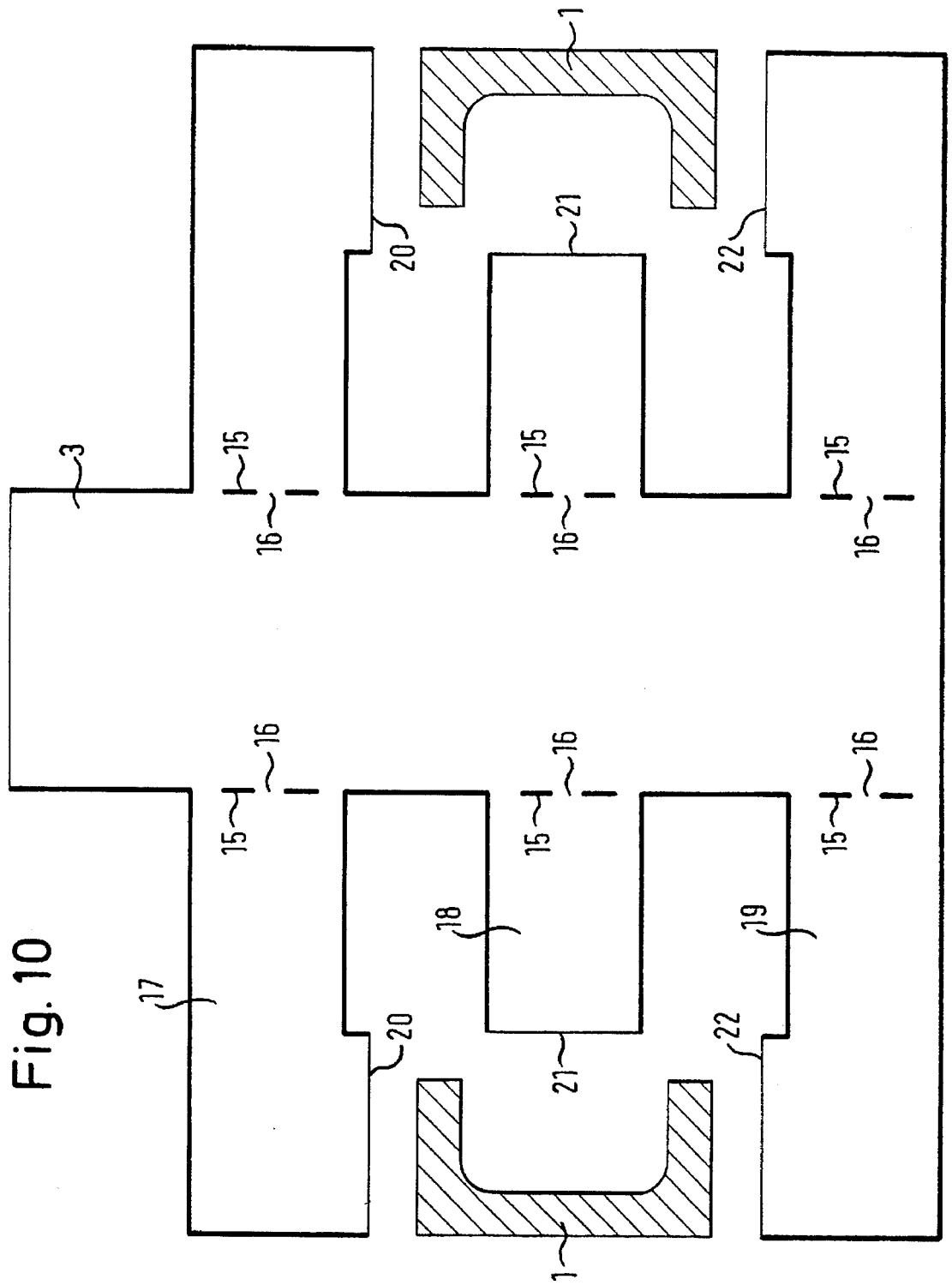

METHOD AND APPARATUS OF MANUFACTURING PNEUMATIC VEHICLE TIRES

The invention relates to a method of manufacturing pneumatic vehicle tires, with a carcass extending between two bead rings, and a breaker arranged between the carcass and a tread, and also to an apparatus for use in such a method.

SUMMARY OF THE INVENTION

The object of the present invention is to provide a particularly economical method for the manufacture of pneumatic vehicle tires of non-metallic components which ensures a high quality of the tires.

This object is satisfied by a method in which the respective tire blank is built up using exclusively non-metallic components and wherein, in the course of vulcanizing and shaping which takes place under the action of heat and pressure, at least a part of the required thermal energy is introduced into the tire in the form of microwave energy and the temperature prevailing in the tire is controlled or regulated in dependence on the temperature development in different tire regions and differently for different tire regions.

In accordance with the invention, the temperature which prevails in the tire during the treatment of the tire is controlled or regulated. In this way, an ideal thermal treatment of the tire is ensured. The thermal treatment can in particular take place in dependence on the different temperature development in different tire regions. For this purpose, temperature sensors can be provided on and/or in the tire. The temperature sensors can, however, also be accommodated in the heating or pressing mould which accommodates the tires; in particular infrared temperature sensors can also be used.

The temperature regulation or control can in particular take place in such a way that the microwave energy, which is introduced into specific tire regions, is intentionally changed. Another possibility lies in providing for cooling of specific tire regions. In this manner, it is possible to react very quickly to overheating which occurs or threatens and which could otherwise lead to defective tire regions.

The control or regulation of the temperature during the treatment of the tire can in particular also take place in time dependent manner, that is to say the tire can be respectively held at a specific temperature for specific times. This can also take place differently for the individual tire regions, for example the bead region can be held for a longer period of time at higher temperature than the remaining tire regions. The cooling of specific tire regions can in particular also take place in that the heat is led away from such regions and is conducted to other regions of the tire, so that the heat which is present is not lost. Thus a kind of heat exchange takes place within the tire.

The control of the heating temperature can also take place in that the specific heating-up characteristics in the microwave field are associated with the heating mold, so that the energy introduced by thermal conduction can be varied. By way of example, the heating mold can be built up of a base material to which suitable fillers are admixed which endow the heating mold with the desired heating-up characteristics, i.e. a specific energy pick-up capability from the microwave field. Carbon black which is embedded in plastic as the base material can, for example, be used as such a filler. Through the quantity and/or the nature of the carbon black which is introduced, the heating up characteristic of the heating mold can be varied, and indeed also in different manners in specific tire regions.

As a base material, a material is preferably used which fuses above the heating temperature for tires, for example a polyamide, a ceramic material, or also mixtures of different materials. The introduction of the filler in the molten state of the base material advantageously brings about a uniform distribution of the filler over the desired region. The influencing of the heating up characteristics can not only take place through the quantity of filler, but rather also via the type of filler, in particular via the type of carbon black. In this manner, temperature differences can be achieved over the tire, for example differences of between 20° C. and 30° C.

For the cooling, channels can be provide in the heating mold through which coolant liquid or heat exchange fluid can be conducted.

In accordance with a further layout of the invention, the control or regulation of a different energy input into different regions of the tire can take place by a corresponding geometry of the microwave field which can, for example, be achieved by suitable reflection and refraction, for example for the generation of standing waves. In order to generate standing waves, the microwave guides and the microwave vessels can have a geometry such that they represent an integral multiple of the wavelength, of the half wavelength, or of a quarter of the wavelength. Microwaves of different wavelength can self-evidently also be simultaneously used. The different energy input can, however, also take place by covering over specific regions of the tire, at least for a period of time. For this purpose, screens can also be used which reflect the microwave radiation, and thus keep it out of the way of the desired tire regions. The screens can be pivotable or provided with closable openings in order to restrict the screening timewise and to make its use optional.

In accordance with an advantageous layout of the method of the invention, the heating up characteristics of the heated mold are determined in tests prior to the treatment of tires in that temperatures sensors are arranged in and/or on a tire and/or in the heated mold and the heating up characteristics measured. The temperature distribution can in this way be optimized by matching or adaption of the heating mold with respect to the material or the cooling devices. Thus the process parameters which are subsequently used in the treating of tires are determined in test series In accordance with a particular layout of the invention, the method of the main application is so used that a tire blank is first conventionally pre-heated, or is pre-heated by microwave energy. Thereafter, the tire is subjected to pressure in a heating press and is warmed up. Finally, the tire is taken under pressure out of the heating press and is vulcanized out in a microwave plant. During this, the time in which the tire is treated in the heated press is reduced, so that the relatively expensive heating presses can have an elevated throughput. For this, a special pressure mold can be provided which must self-evidently be suitable for microwaves. This pressure mold can fully surround the tire blank and can take the place of the membrane which is conventionally used. Alternatively, an apparatus can be used which maintains the pressure applied to the tire via the membrane.

The treatment in a heating press can take place under a pressure of up to ca. 30 bar, and also at a temperature of 110° C. and can, for example, last for 4 to 5 minutes. The vulcanisation out in the microwave plant can then, for example, take place at a temperature of 260° C. During this, the tire stands under a pressure of preferably at least 10 bar to 12 bar. In this way it is ensured that no bubbles arise during the vulcanization which could lead to a defective tire.

In accordance with a further advantageous layout of the invention, the treatment of the vehicle tire takes place with a rotationally symmetrical microwave field which preferably radiates through the tire in the radial direction. Through these layouts, differences in the tire quality in the circumferential direction of the tire are avoided which could lead to later tire defects, or at least to a reduction in quality.

The microwaves are preferably introduced axially into the center of the tire or the tire heating mold and are guided from there through the tire blank in the radial direction by corresponding deflection devices. The radial microwave field can also be generated in that a field outlet of the microwave energy which is centrally introduced into the tire or tire mold is only possible in the radial direction. Preferably, microwave reflecting plates are present for this purpose axially on both sides of the tire or of the tire mold, with the axially introduced microwave energy being reflected to and fro between the plates. The microwaves can then emerge and penetrate through the tire blank in the radial direction. They are reflected at the earliest by the tire heating mold, insofar as this consists of microwave reflecting material, and are thus trapped within the microwave system. In place of the tire heating mold, an apparatus which is provided especially for this purpose can, however, also be provided in order to trap the microwaves in the system.

The two microwave reflecting plates can be movable relative to one another, with this preferably taking place symmetrically to the central plane of the tire. In this manner, the reflection and diffraction picture changes, so that an intentional distribution of the microwave energy over the tire, or a smoothing out of the distribution of the microwave energy can be achieved.

On the whole, the method of the invention aims, as already explained above, at generating a rotationally symmetrical microwave field. For this purpose, a smoothing out of the distribution of the microwave energy is thus necessary, since the latter naturally tends to a non-uniform distribution.

Standing waves can arise in microwave guides and microwave vessels which form the plate arrangement together with the tire mold or the separate apparatus, which lead to a periodic distribution of the microwave energy. In order to avoid such a non-uniform distribution, the corresponding microwave guides and vessels are so formed that, as far as possible, no standing waves can occur. Alternatively, standing waves can, however, also be intentionally used in that the microwave energy is introduced in amplified manner into specific tire regions.

It is also possible to achieve a smoothing out of the microwave energy introduced into the tire by movement of the tire relative to the microwave field or movement of the microwave field relative to the tire, and this take place both with standing waves or also without standing waves.

In any event, it is important that a non-uniform distribution is either smoothed out over a period of time, or is, however, only used in a desired manner. Desired non-uniform distributions of the energy input, however, mainly arise in the axial direction. A stronger energy input can be provided in the bead region of the tire than in the remaining regions of the tire. This can also take place by corresponding relative movements of the treated tire relative to the microwave field or of the microwave field relative to the treated tire.

A possibility for the relative movement lies in rotating the tire being treated together with the tire mold in the radial microwave field, and optionally to move it to and fro in the axial direction, with the axial movement taking place in such a way that dwell times in specific regions, in particular in the bead region, are greater than in other regions.

Another possibility for smoothing out the energy input or for intentional energy input lies in permitting the microwave field, which is introduced centrally into the tire or into the tire mold, to rotate in that the microwave guide has at least one radial opening in the centre of the tire which is rotatable about the tire axis. The microwave guide is, for this purpose, angled at the centre of the tire mold or has a T-shaped or a singly or multiply crossed end piece with correspondingly orientated outlet openings for the microwave radiation. The end piece or the openings can also be axially moved to and fro or can be or are inclined to the radial direction in order to again bring about a distribution and directed introduction of the microwave energy in the axial direction.

The orientation of the microwaves via the opening of the wave guide which introduces them or via the reflectors can also take place in such a way that the outlet direction or the direction of reflection changes along a spiral track. In this way, a smoothing out and an intentional introduction of the microwave energy into specific tire regions is also made possible.

In place of a microwave guide with a radial opening, one can also provide an axially opening wave guide having a microwave reflecting arrangement, in particular a microwave stirrer, present in front of its mouth. On rotation of this arrangement the microwaves are uniformly distributed in the circumferential direction of the tire. A plurality of such arrangements can, however, be provided, also in other regions of the microwave arrangement.

In a particular layout, the microwave reflecting arrangement has vanes which are rotatable about their longitudinal axis as reflectors for the microwave energy. By changing the angle of attack of the vanes of this arrangement, the microwave energy can be deflected into specific regions of the tire. However, a plurality of vanes can also be provided which have at least partly differing angles of attack in order to thereby achieve the desired distribution of the microwave energy over the tire. It should be noted that distribution of the microwave energy in the axial direction of the tire will be influenced in this way, whereas the rotational symmetry of the microwave energy which is introduced is ensured over time by rotation of the respective arrangement about the tire axis.

A further possibility of influencing the distribution of the microwave energy lies in intentionally using the scattering effects of the microwaves via the geometry and the surface layout of the arrangement. A plurality of scattering devices leads, in particular in conjunction with a multiple reflection, to a smoothing out of the spatial distribution of the introduced microwave energy.

Finally, all the walls of the microwave vessel which surround the tire to be treated can in general be adjustable, in particular tiltable or variable in their spacing relative to one another, in order to achieve an intentional distribution or smoothing out of the microwave energy that is introduced.

A further possibility for introducing a radial microwave field into the tire fundamentally lies in introducing the microwave energy from the outside in the radial direction towards the tire centre. For this, the tire mold must naturally be permeable to microwaves. At the opposite side of the tire mold, a microwave reflecting apparatus is then present, in order to ensure a concentration of the microwave energy in the tire. The microwave introducing arrangement or the tire are in turn rotatable about the axis of the tire, in order to ensure rotational symmetry of the microwave energy that is introduced as a function of time. An intentional distribution of the microwave energy over the tire can be correspondingly brought about via the above described measures, in particular by to and fro movement, optionally with different dwell times, in the axial direction or by tilting the mouth of the microwave guide relative to the radial direction.

Naturally all the measures can be also be combined with the previously described measures for temperature control or regulation via the layout and material of the microwave mold.

The microwave mold or the treated tire can be located in accordance with the invention inside or outside of the above described plate arrangement. The plate arrangement can also be so designed that the opening broadens outwardly in the radial direction in the manner of a horn antenna. This takes care of a further smoothing out of the radial field. In this case, the tire is preferably located in the, or outside of the, horn region.

Finally, the entire arrangement can be formed as a closed system and can be subjected to pressure. In this way, the tire can be set under pressure or can be held under pressure. In the second case, the tire can have previously been set under pressure in a press. It is subsequently brought, while maintaining the pressure, for example via a mold, into the microwave arrangement which, in turn, stands under pressure.

The described microwave arrangements can also be built into a conventional heating press. This is cost favorable and space-saving. Moreover, the manufacturing process is accelerated because no additional insertion into the microwave mold is necessary.

BRIEF DESCRIPTION OF THE DRAWINGS

Various microwave arrangements are shown in the drawings.

There are shown:

FIG. 5 is a perspective illustration of the mouth or outlet end of a microwave guide, FIG. 6 is a cross-section through a variant of the microwave guide, FIG. 10 is a still further variant of a microwave arrangement.

DETAILED DESCRIPTION OF THE INVENTION

Figure 1:
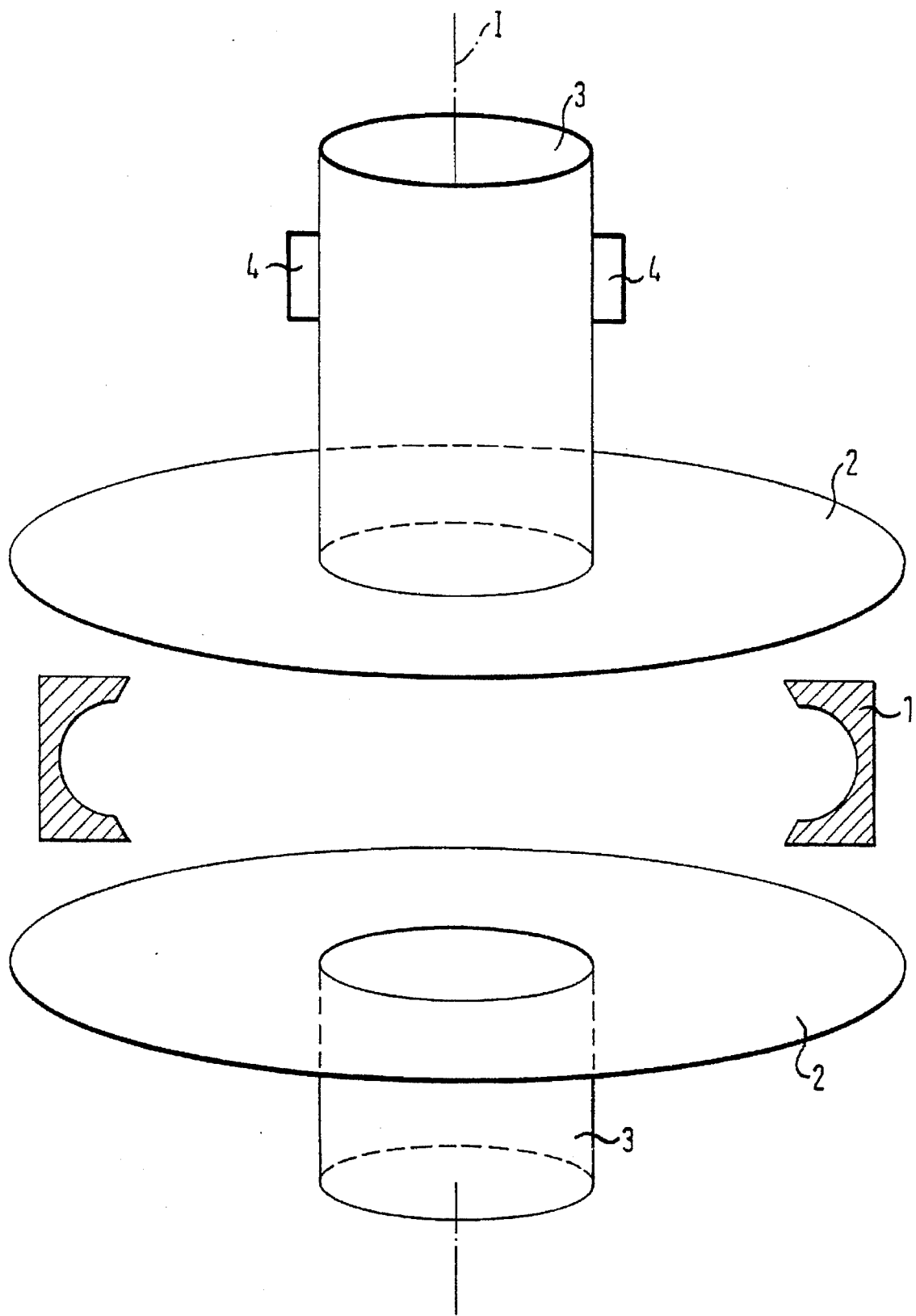
FIG. 1 is a perspective illustration of a first variant of a microwave arrangement.

In the microwave arrangement shown in FIG. 1, the tire (not illustrated) together with the tire heating mold 1 is located between two parallel, circular microwave reflecting plates 2, the planes of which extend perpendicular to the axial direction of the tire. The plates 2 each have a central passage opening onto which in each case a microwave guide 3 is joined towards the outside. The microwave guides 3 have additional coupling-in points or ports 4 for microwaves.

Microwaves are introduced axially into the center of the tire mold 1 via the wave guide 3 and reflected to and fro between the parallel plates 2. An emergence of the microwaves is only possible in the radial direction, with the microwaves penetrating radially through the tire present in the tire mold 1 and transmitting heating up energy to the tire.

Figure 2:
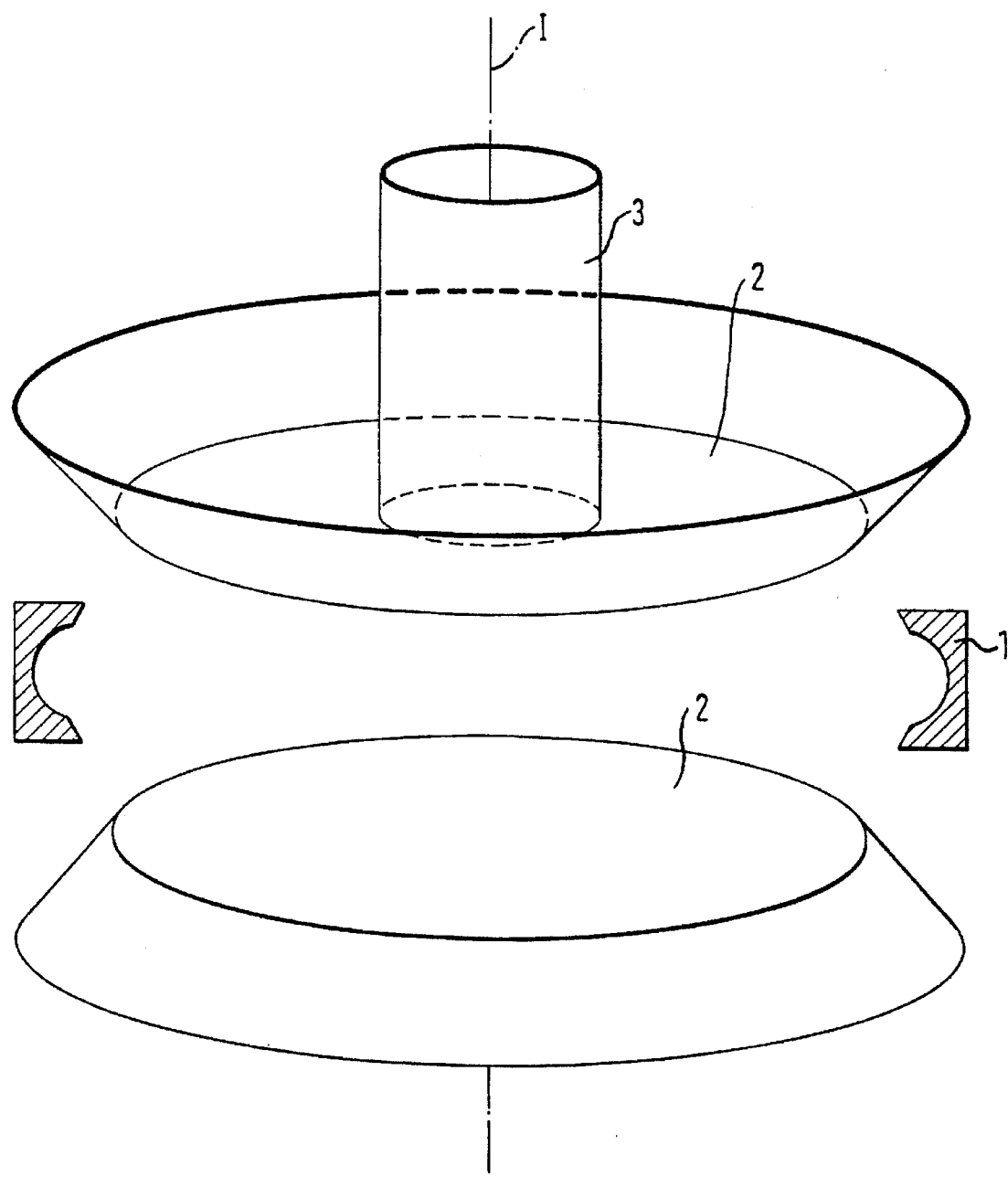
FIG. 2 is a second variant of a microwave arrangement.

In the variant of FIG. 2, the two parallel microwave reflecting plates 2, which are present axially on both sides of the tire heating mold 1, are broadened at their radially outer borders in horn-like manner in the axial direction. The tire heating mold 1 is located in this variant in the horn region. It can, however, also be provided outside of the horn region in just the same way as it can be provided radially outside of the two plates in the variant of FIG. 1.

Figure 3:
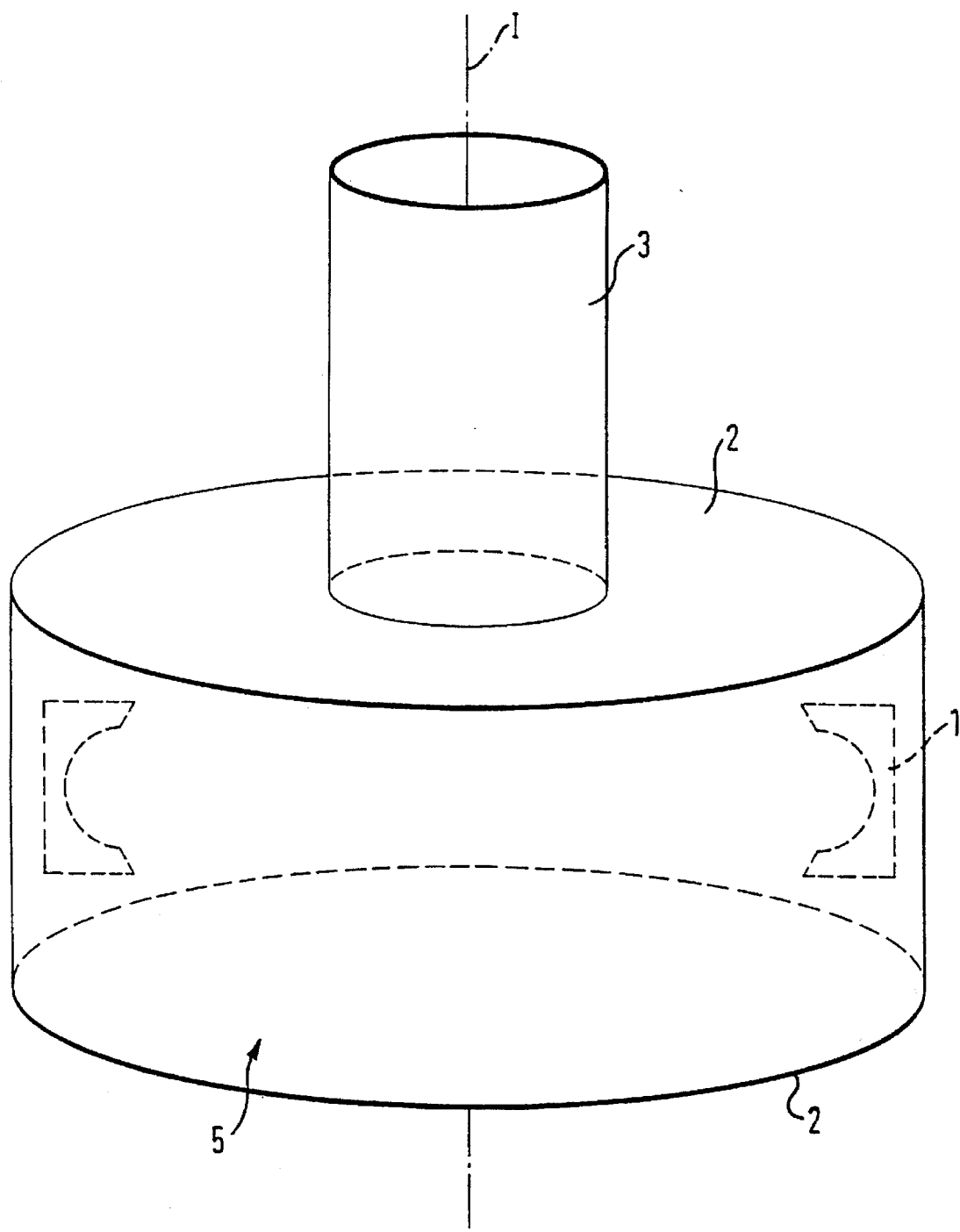
FIG. 3 is a third variant of a microwave arrangement.

In the variant of FIG. 3, the microwave plant is enclosed by a housing 5 which, on the one hand, prevents an exit of microwaves and, on the other hand, can be formed as a pressure chamber. The two parallel plates respectively form a boundary surface of the housing 5.

Figure 4:
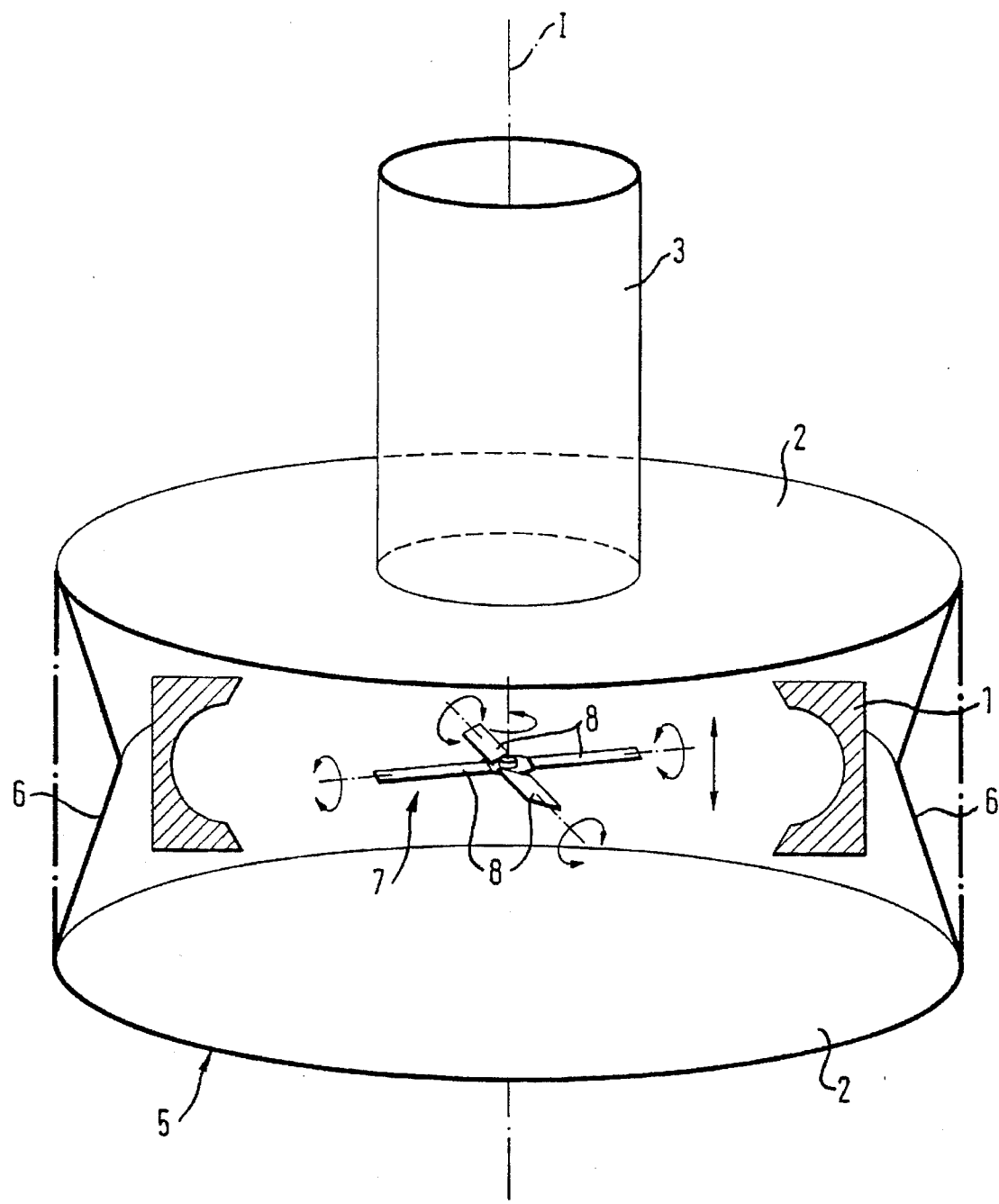
FIG. 4 is a fourth variant of a microwave arrangement.

In FIG. 4 a further variant is illustrated in which the radial boundary surfaces of the microwave housing 5 can be inclined and can be varied in their spacing from one another. This is indicated by the wedges 6 at the sides. Furthermore, a microwave stirrer 7 rotatable about the tire axis is present in this variant in front of the outlet opening of the microwave guide 3 at the center of the tire heating mold 1 and is, on the one hand, preferably movable to and fro in the axial direction and, on the other hand, has vanes 8 which are of adjustable inclination. The vanes consist of microwave reflecting material and serve for distribution of the microwave radiation introduced via the wave guide 3. The microwave stirrer rotates about the tire axis in order to ensure, over time, a rotational symmetry of the microwave energy which is introduced.

FIG. 5 shows the mouth end 10 of a variant of the wave guide 3 which is located in the center of the tire heating mold. In the illustrated embodiment, the mouth end 10 of the microwave guide 3 is of T-shape form, with two outlet openings which point in the radial direction and which broaden out in horn-like manner in order to avoid diffraction of the microwaves. The mouths 9 are rotatable about the tire axis and are movable to and fro in the axial direction or inclinable to the radial direction.

In the variant of the wave guide 3 shown in FIG. 6, microwave absorbing or reflecting flaps 11, with which specific tire regions can be screened, are arranged in the region of the radial outlet openings 9. By pivoting the flaps outwardly, the irradiation of these regions with microwave energy is prevented, so that, in this manner, the energy input into specific tire regions is controllable. The flaps 11 can either be pivoted outwardly during the entire duration of the treatment or, however, only for a specific time, in order to achieve the desired energy input into the affected regions. The arrows 12 in FIG. 6 show the direction in which the flaps 11 can be pivoted away. Here, in the same way as in FIG. 5, the cross-section of the outlet opening 9 of the wave guide 3 is greater than the width of the tire to be treated or of the tire heating mold 1.

Figure 7:
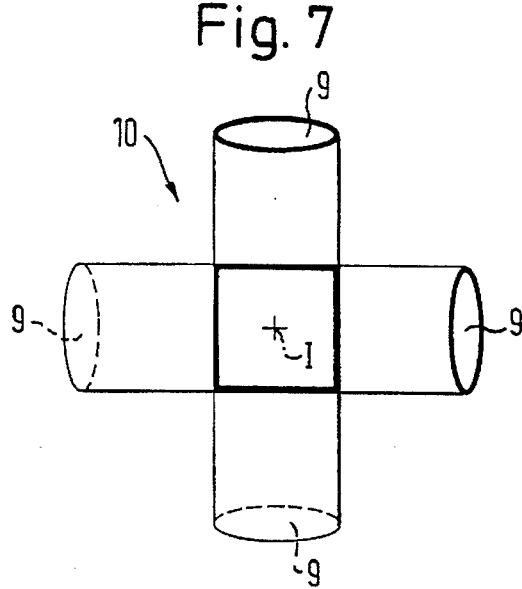
FIG. 7 is a plan view of an end piece of a microwave guide.
Figure 8:
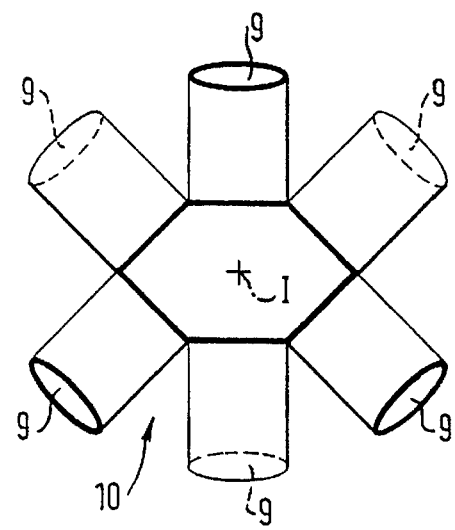
FIG. 8 is a plan view of a variant of the end piece of a microwave guide.

In FIGS. 7 and 8, two variants of the end pieces 10 of the wave guide 3 are shown in plan view which can be used as an alternative to the T-shaped end piece of the wave guide 3 of FIG. 5. FIG. 7 shows two crossed wave guide sections lying in a plane, with four outlet openings 9 for the microwave radiation which respectively point in opposite directions. FIG. 8 shows an embodiment in which the radial outlet openings 9 can have different angles of inclination between 0° and 90° to the radial direction. In this way, various tire regions can be intentionally energized with microwave energy. The end pieces 10 of the wave guide 3 shown in FIGS. 7 and 8 are likewise rotatable with the wave guide about the axis 1 in the same way as the variants shown in FIG. 6 in order to achieve rotational symmetry in this case also.

Figure 9:
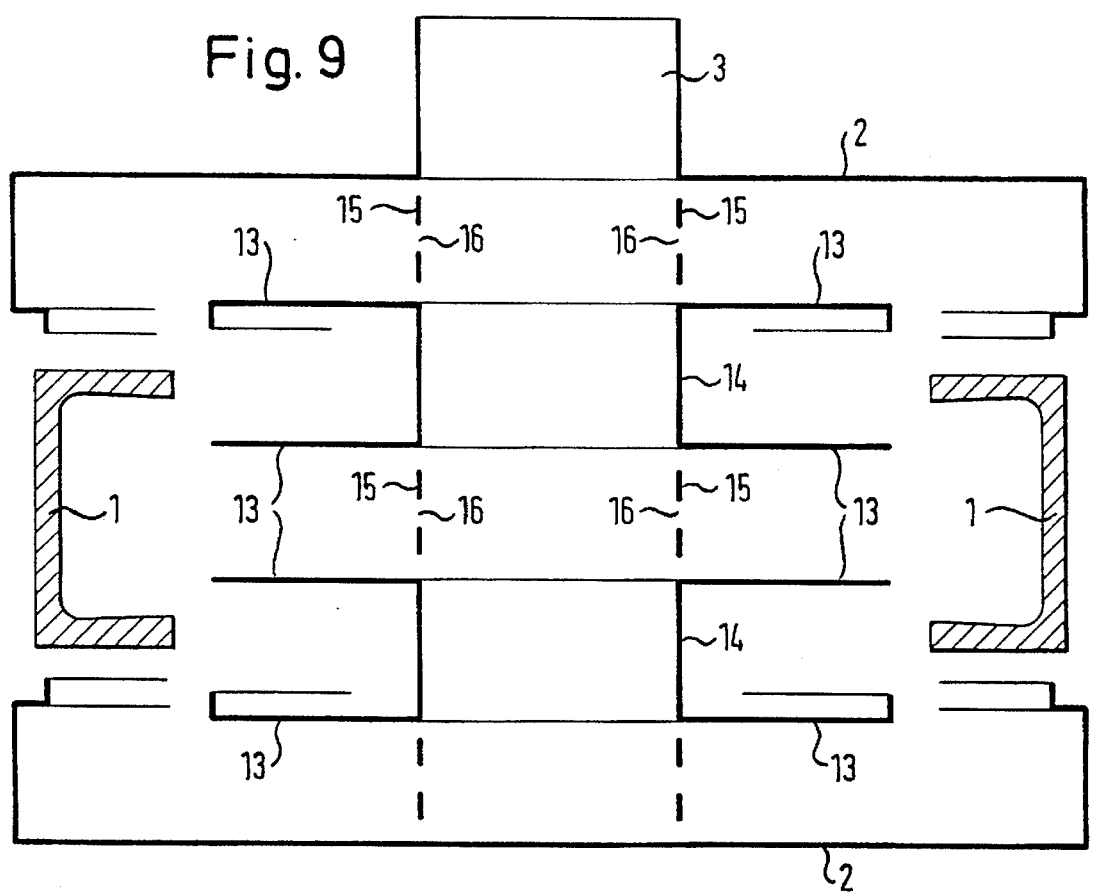
FIG. 9 is a further variant of a microwave arrangement.

FIG. 9 shows a further microwave arrangement with parallel plates 2 between which the tire heating mold is arranged and which have central cut-outs for the axial supply of the microwave energy via wave guide 3. Further plates 13 of microwave reflecting material are present between the plates 2 parallel to the latter and likewise have a central cutout. In each case, two of these plates 13 are connected to one another via hollow cylinders 14 which are aligned with the through-openings and which likewise consists of microwave reflecting material. In this manner, a specially structured hollow cavity arises in which the microwaves can propagate, in order to be intentionally directed into specific tire regions. In this hollow cavity, additional screens 15 for the microwave radiation can be present which, moreover, can have closable passage openings 16 for the microwave radiation. The distribution of the microwave energy can be controlled within the said hollow cavity and thus the energy input into specific tire regions, through the screens 15 and also through opening and closing of the passage opening 16.

FIG. 10 shows a variant of the microwave arrangement of FIG. 9 in which, instead of the plates 13, the wave guide 3 is provided in the axial direction with end pieces 17, 18, 19 which follow one another in the axial direction and of which the central one is located in the plane of the tire heating mold 1 and is provided with radially opening outlet openings 21. The two axially outer end pieces 17 and 19, however, have axially opening outlet openings 20 and 22 which are respectively directed in the direction towards the tire heating mold. For this purpose, the end pieces 17 and 19 are angled twice relative to the wave guide 3 and the end piece 18 once.

Screens 15 with closable passage openings 16 can, in turn, be provided in the end pieces 17, 18 and 19 through which the throughflux of the microwave radiation in the respective end piece 17, 18, 19 can be controlled. An intentional energy input into specific tire regions is also made possible in this manner. With this layout, the end pieces 17, 18 and 19 are also rotatable with the wave guide 3 about the axis I in order to achieve a rotationally symmetrical distribution of the microwave energy, at least over a period of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of manufacturing pneumatic vehicle tires which have a carcass which extends between two bead rings and a breaker arranged between the carcass and a tread, wherein the respective tire blank is built up using exclusively non-metallic components and has a plurality of specific tire regions, comprising the steps of:

vulcanizing and shaping the tire blank under the action of heat and pressure including introducing into said tire blank at least a part of the thermal energy that is required in the form of microwave energy produced by generating a microwave field; and controlling temperature in at least one of said specific tire regions in dependence on a temperature development in each of said at least one of said specific tire regions.

2. The method in accordance with claim 1, wherein the step of controlling temperature includes at least one of the steps of changing the microwave energy introduced into said at least one of said specific tire regions, cooling said at least one of said specific tire regions, or exchanging thermal energy between at least two of said specific tire regions.

3. The method in accordance with claim 1, wherein the step of controlling temperature in each of said at least one of said specific tire regions includes associating specific heating up characteristics of the corresponding regions of a heating mold when subjected to the microwave field, the association step including the addition of at least one of type filler to a base material of the heating mold.

4. The method in accordance with claim 3, wherein the associating step further includes heating the base material to a molten state prior to adding said at least one filler thereto.

5. The method in accordance with claim 4, wherein the controlling temperature step includes structuring the geometry of the microwave field using at least one of reflection and refraction structures and of a partial covering over of said at least one of said specific tire regions using microwave reflecting flaps.

6. The method in accordance with claim 4, further comprising the step of:

establishing the specific heating up characteristics of the heating mold using temperature sensors disposed at least one location of the group consisting of in the tire blank, adjacent to the tire blank, in the heating mold, and adjacent to the heating mold.

7. The method in accordance with claim 1, further comprising, prior to the vulcanizing and shaping step, the steps of:

pre-heating the tire blank;

then pressurizing and heating the tire blank in a heating press; and then removing the tire from the heating press under pressure.

8. A method in accordance with claim 1, further comprising the step of:

designing and applying the microwave field to be rotationally symmetrical to radiate radially through the tire blank, with the microwave rays being axially introduced into the center of the tire blank and deflected therein into the radial direction thereof.

9. A method in accordance with claim 8, further comprising the step of:

moving the microwave field relative to the tire blank such that the microwave energy introduced therein is at least one of smoothed out over time in the circumferential direction of the tire blank and distributed in the axial direction thereof.

10. An apparatus for carrying out a method of manufacturing pneumatic vehicle tires which have a carcass which extends between two bead rings and a breaker arranged between the carcass and a tread, wherein the respective tire blank is built up using exclusively non-metallic components and has a plurality of specific tire regions, comprising the steps of: vulcanizing and shaping the tire blank under the action of heat and pressure including introducing into said tire blank at least a part of the thermal energy that is required in the form of microwave energy produced by generating a microwave field; and controlling temperature in at least one of said specific tire regions in dependence on a temperature development in each of said at least one of said specific tire regions, wherein the apparatus comprises: two parallel microwave reflecting plates with a space therebetween into which at least one of the tire blank or a tire heating mold is introducible, with the two plates extending perpendicular to the tire blank axial axis (I), and at least one of the plates having a central cut-out for the introduction of the microwave energy into the center of the tire blank.

11. The apparatus in accordance with claim 10, wherein the two microwave reflecting plates (2) are moveable relative to one another, symmetrically to the central plane of the tire blank.

12. The apparatus in accordance with claim 10, wherein the plates (2) are extended outwardly obliquely to a radial axis of the tire blank to form a horn-like rim, with the tire blank being arranged in the rim region or radially outward thereof.

13. An apparatus for carrying out a method of manufacturing pneumatic vehicle tires which have a carcass which extends between two bead rings and a breaker arranged between the carcass and a tread, wherein the respective tire blank is built up using exclusively non-metallic components and has a plurality of specific tire regions, comprising the steps of: vulcanizing and shaping the tire blank under the action of heat and pressure including introducing into said tire blank at least a part of the thermal energy that is required in the form of microwave energy produced by generating a microwave field; and controlling temperature in at least one of said specific tire regions in dependence on a temperature development in each of said at least one of said specific tire regions, wherein the apparatus comprises:

a pair of parallel reflecting plates and at least one hollow microwave guide for introducing the microwave energy through a central cut-out in at least one of the plates into the center of the tire blank or into a tire heating mold, said at least one guide having at least one outlet opening directed in the radial direction of the tire blank for guiding the microwave energy, with said at least one wave guide including a mouth end having a shape selected from the group consisting of a single crossing end piece and a cross-shaped end piece providing four or more outlet openings, for guiding the microwave energy.

14. The apparatus in accordance with claim 13, wherein said at least one outlet opening is adapted to be at least one of the group consisting of rotatable about the tire blank axis (I), inclinable to the radial direction of the tire blank, movable on a spiral track around the tire blank axis (I) and axially movable to and fro along the tire blank axis (I).

15. The apparatus in accordance with claim 14, further comprising at least one microwave stirrer arranged between the two plates (2) in front of the central cut-out for the introduction of the microwave energy, said at least one microwave stirrer being rotatable about the tire blank axis and movable along tire blank axis and having a plurality of vanes, at least one of said plurality of vanes being rotatable about its longitudinal axis.

16. An apparatus for carrying out a method of manufacturing pneumatic vehicle tires which have a carcass which extends between two bead rings and a breaker arranged between the carcass and a tread, wherein the respective tire blank is built up using exclusively non-metallic components and has a plurality of specific tire regions, comprising the steps of: vulcanizing and shaping the tire blank under the action of heat and pressure including introducing into said tire blank at least a part of the thermal energy that is required in the form of microwave energy produced by generating a microwave field; and controlling temperature in at least one of said specific tire regions in dependence on a temperature development in each of said at least one of said specific tire regions, wherein.

the apparatus comprises: a plurality of reflecting plates and at least one hollow microwave guide for introducing the microwave energy through a central cut-out in at least one of the plates into the center of the tire blank or into a tire heating mold, said at least one guide having at least one outlet opening directed in the radial direction of the tire blank for guiding the microwave energy, and a plurality of screens disposed inside said at least one said wave guide, at least one of said plurality of screens being selected from the group consisting of a pivotable screen and a screen having closable openings; and a plurality of microwave reflecting walls surrounding the tire blank, said plurality of walls being at least one of the group consisting of inclinable relative to one another and movable relative to one another.

17. The apparatus in accordance with claim 13, wherein the distance between the outlet opening of the wave guide and the tire is less than the wavelength of the microwave.

18. The apparatus in accordance with claim 16 wherein the plurality of plates are parallel to one another.

* * * * *